June 14, 1938.   R. PYZEL   2,120,712
REACTIVATION OF SOLID PHOSPHORIC ACID CATALYSTS
Filed Feb. 8, 1937
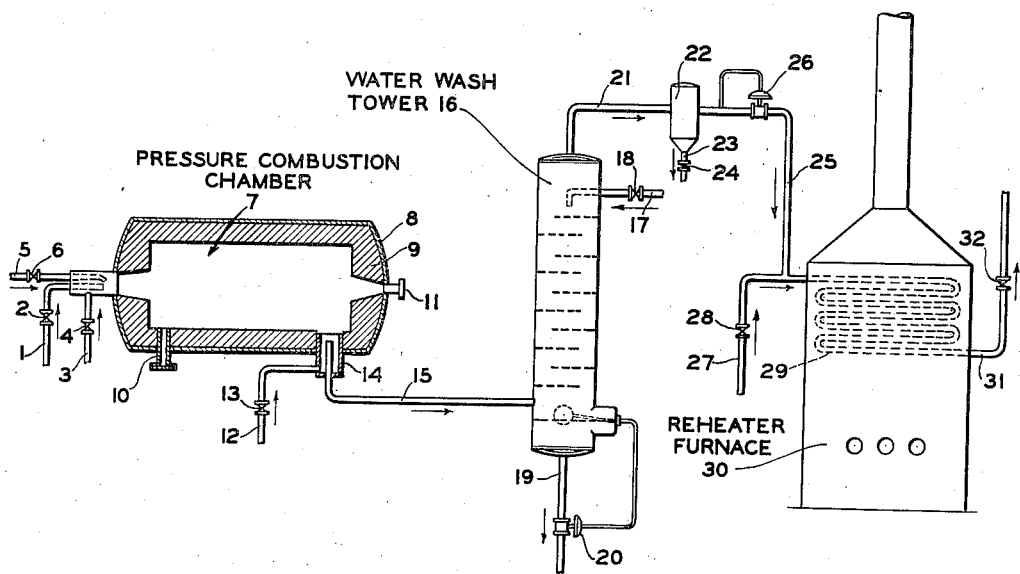
INVENTOR
ROBERT PYZEL
BY *Lee J. Gary*
ATTORNEY Patented June 14, 1938

2,120,712

UNITED STATES PATENT OFFICE 2,120,712

REACTIVATION OF SOLID PHOSPHORIC ACID CATALYSTS

Robert Pyzel, Chicago, Ill., assignor to Universal Oil Products Company, Chicago, Ill., a corporation of Delaware Application February 8, 1937, Serial No. 124,563

15 Claims. (Cl. 23—238)

This application is a continuation-in-part of my co-pending application, Serial No. 52,203, filed November 29, 1935, and has particular reference to the use of gas mixtures relatively low in both oxygen and moisture content in reactivating catalytic materials which have been employed in hydrocarbon or other organic conversion reactions and which have become fouled by the deposition of carbonaceous residues which render the catalyst particles relatively inert.

More specifically the invention has reference to the use of these gas mixtures for the reactivation of a particular type of granular catalyst which has become spent in effecting polymerization and/or alkylation reactions among olefinic hydrocarbons such as those occurring in the gas mixtures produced by cracking of petroleum hydrocarbons. The particular type of granular catalyst referred to comprises solid phosphoric acid catalysts such as that of Ipatieff patent, No. 2,018,065, issued October 22, 1935.

The gradual depreciation of solid catalysts employed to accelerate miscellaneous organic reactions is a matter of common observation. The loss in activity is largely attributable to the deposition of tarry or carbonaceous substances on the catalytic surfaces. A suitable expedient for restoring the activity of such deteriorated catalytic materials is to oxidize the carbonaceous deposits by means of air or oxygen or other oxidizing gas mixtures, at temperatures corresponding to a practical and controllable rate of oxidation.

In the restoration of granular catalysts in situ by means of air, it is frequently impossible to control the temperature within a proper range owing to the difficulty in dissipating the heat of combustion, particularly when the deteriorated catalyst is contained in treating towers or tubes of considerable diameter, say from six inches to several feet. While small scale control tests may indicate the possibility of ready reactivation by air alone, because of the relatively large radiation losses from the small equipment used, it has been observed that comparable results are not obtainable in commercial equipment owing to the impossibility of holding the temperature below a prescribed maximum, above which sintering or fluxing or changes in the chemical composition of the catalyst occur so that its structure and catalytic effectiveness are permanently impaired.

In one specific embodiment the present invention comprises the restoration of the activity of spent granular catalysts and particularly solid phosphoric acid catalysts which have become coated with carbonaceous deposits after use in hydrocarbon reactions by passing thereover combustion gases of graded oxygen content and containing less than 5% by volume of water vapor, followed by steaming at lower temperatures than those employed in the oxidizing step to rehydrate the active constituent to a definite point.

In the present process combustion gas mixtures containing both a low oxygen and a low water content are generated by burning gaseous or liquid hydrocarbon fuels under super-atmospheric pressure in the presence of limited quantities of air, cooling and dehumidifying the gas mixture by washing with water and then reheating the gas mixture for use in burning off the carbonaceous deposits from the catalyst. As in my previous application already referred to, the oxygen content of the gas mixture first employed in the case of highly carbonized catalysts such as the spent phosphoric acid catalysts mentioned is considerably below 1% and this percentage is raised gradually until substantially air alone is finally used to insure the complete removal by burning of the carbonaceous deposits, the water vapor content of the gas mixtures being maintained at all times below 5% and preferably below 3%. The steps in the production of these low oxygen and low moisture content gases may be illustrated by a description in connection with a particular operation and for the description of this operation the attached drawing has been provided which shows in essential detail by the use of conventional figures in side elevation and vertical cross section, arrangements of apparatus in which the process of producing the regenerating gas mixtures may be conducted.

Referring to the drawing, a pressure combustion chamber followed by a water-wash tower and a final heater with means for the introduction of additional air when necessary or desirable is shown.

As shown on the drawing, the pressure combustion chamber 7 consists preferably of a steel shell 8 lined with refractory material 9 and the chamber is of cylindrical shape to embody the safest construction for pressure operation. Fuel for the combustion is admitted through line 1 containing control valve 2, and air necessary for combustion is admitted through line 3 containing control valve 4 into the annular space surrounding the fuel line. A small port 10 is provided for the insertion of a torch for initiating combustion and a sight glass 11 is provided for direct visional observation of the character of the combustion taking place in the chamber. Water or steam may be introduced through line 5 containing control valve 6 to control the temperature in the combustion chamber so that overheating of the refractory lining may be avoided. The introduction of water or steam is an essential feature of the operation of the combustion chamber. In ordinary practice excess air may be employed in the combustion of liquid or gaseous fuels to produce combustion products of temperatures sufficiently low so as to avoid fusing of the refractory materials used in the apparatus wherein the combustion takes place. The gas mixtures used in reactivating carbonized catalysts must initially contain very low oxygen concentrations. It is therefore impossible to protect the refractory lining of the combustion zone by using excess air, and hence the necessity for introducing water or steam.

The gases produced in the combustion chamber contain considerable quantities of steam, not only by reason of the steam or water purposely introduced into the combustion chamber, but also because of the steam formed as a result of the oxidation of the hydrocarbon fuel. The water content of these gases is reduced to below 5% by condensation. The cooling of the gases is accomplished by direct contact with water. Part of the cooling water is applied to the combustion gases leaving the combustion chamber through line 15. This part of the cooling water is introduced through line 12 containing control valve 13 and enters the outlet of the combustion chamber at the jacket 14 overflowing into line 15 and passing in combination with the combustion gases to the water wash tower 16. Cooling at this point is desirable in that it protects the steel outlet connection of the combustion chamber, the lines leading from the combustion chamber to the water wash tower, and the lower section of the water wash tower, against excessive temperatures. The amount of cooling water introduced at this point must be sufficient to obtain temperatures at which the steel lines are unaffected. Final cooling of the combustion gases is accomplished by countercurrent water washing in water wash tower 16. The final cooling water used enters the water wash tower 16 through line 17 containing control valve 18 and flows downward countercurrent to the rising combustion gases, over a series of trays or other surface-providing tower packing. The water introduced through lines 5, 12 and 17, and the condensed water of combustion is discharged at the bottom of the water wash tower through line 19 containing control valve 20 which is actuated by the water level in the bottom of the water wash tower.

The cooled combustion gases leave the water wash tower 16 through line 21, pass through trap 22 which serves to catch any entrained water (which may be drained through line 23 containing control valve 24), and flows through automatic back pressure control valve 26, through line 25 to the reheater furnace 30.

The countercurrent cooling of the combustion gases will reduce the temperature of these gases to below 100° F. while the pressure is on the order of 30 to 40 pounds per square inch. Under these conditions the percentage of water vapor in the gases leaving the top of tower 16 will not exceed 5% by volume.

The dehumidified gases leaving the water wash tower are now heated to any desired temperature which may have been found most suitable for initiating the oxidation of the carbonaceous material deposited on the spent catalyst granules.

The percentage of oxygen in the reactivating gas mixture may be increased without disturbing the operation of the combustion chamber by adding air through line 27 containing control valve 28. This air may be added prior to the passage of the gases through heater coil 29 arranged in furnace 30. From an economical standpoint it has been found that the overall advantages which might seem to accrue from employing the excess heat of the combustion gases to reheat them after their dehumidifying, is not warranted so that it is preferred to cool and dehumidify them as shown and reheat in an auxiliary furnace. By this system the controls are all positive and the combustion chamber and other parts of the equipment are not complicated by the addition of heat exchangers. It is to be understood, however, that in very large installations, the use of heat exchange may be advisable for economic reasons. The finally prepared combustion gas mixture passes through line 31 containing valve 32 to the service for which they are required.

In reactivating spent solid phosphoric acid catalysts which have a lowered efficiency due to the deposition of carbonaceous residues it has been found, as shown in my co-pending application Serial No. 52,203, filed November 29, 1935, that it is necessary to start with gas mixtures of extremely low oxygen content in burning off these carbonaceous materials, otherwise the heat of combustion of the carbonaceous deposits on the catalyst raises the temperature to such a high point that permanent damage to the catalyst results. It has now been determined that in addition to the need for these low oxygen content gases in the primary stages of reactivation, there is a further definite need for having a minimum of moisture present in the reactivating gases. Although difficult to explain on a theoretical basis, it has been consistently observed that when the moisture content of gases used for reactivating solid phosphoric acid catalyst is of the order of 15–20% (usual moisture content of combustion gases due to oxidation of the hydrogen in the fuel) there is a permanent loss in activity of the reactivated catalyst which is considerably greater than that observed when utilizing very low moisture content gases. This loss of activity is apparently due to actual loss of phosphoric acid.

The low oxygen and moisture content flue gas mixtures generated by the present process are applicable to the reactivation of any type of catalyst which is affected adversely by the use of combustion temperatures above a fixed maximum and is particularly applicable to the restoration of materials, the active constituent of which is affected by the presence of water vapor during reactivation. In the case of the solid phosphoric acid catalysts which are typical of catalysts which require both control of oxygen and water vapor content, it has been found that best results are obtained in reactivating when the moisture content of the reactivating gas mixture is below 5% and the active phosphoric acid constituent is brought back to its most effective composition (state of hydration) by subsequent steaming, usually at temperatures within the range of 450–550° F., which serves to replace the water of hydration of the catalyst lost during the oxidation of the carbonaceous deposits.

The following example is given to indicate the comparative effectiveness of utilizing gas mixtures with a moderately high moisture content (16%) and a very low moisture content (3%) on a spent solid phosphoric acid catalyst which had been used for polymerizing propylene.

Reactivation of catalyst with dry and wet combustion gases

|  | Dried combustion gas containing 3% steam | Combustion gases containing 16% steam |
|---|---|---|
| Catalyst activity, fresh | 83 | 83 |
| Catalyst activity, spent | 18 | 18 |
| Catalyst activity after burning at 1000° F | 40 | 0 |
| Burned and steamed 16 hours at 475° F | 142 | 95 |
| Weight loss after reactivation | 12% | 18% |

In the above tabulation the same maximum temperature of 1000° F. was used in the burning and also the same time and the same amount of oxygen per pound of spent catalyst. The activities were based on a standard activity test and indicate that when burning with the dehumidified gases followed by steaming after the burning, the activity of the reactivated catalyst was much higher than the original, while only a slight increase was noted when gases containing a relatively high moisture content were used in reactivating the spent catalyst. It is also to be observed that there was a greater weight loss when the higher moisture content gases were used.

The character of the present invention and its utility have been shown respectively by the foregoing specification and the example introduced although the proper scope of the invention is not limited in exact correspondence with the descriptive or numerical sections.

I claim as my invention:

1. In the regeneration of carbonized solid phosphoric acid catalysts, the step which comprises contacting the catalyst with hot combustion gases of controlled oxygen content containing less than 5% by volume of water vapor for a sufficient time to effect substantial decarbonization of the catalyst.

2. In the regeneration of carbonized solid phosphoric acid catalysts, the improvement which comprises initially contacting the catalyst with hot combustion gases of relatively low oxygen content and containing less than 5% by volume of water vapor, gradually increasing the oxygen content of the gases and continuing the contacting of the gases with the catalyst until the latter has been substantially decarbonized.

3. In the regeneration of carbonized solid phosphoric acid catalysts, the improvement which comprises initially contacting the catalyst with hot combustion gases of relatively low oxygen content and containing less than 5% by volume of water vapor, gradually increasing the oxygen content of the gases and continuing the contacting of the gases with the catalyst until the carbonaceous matter has been burned off the catalyst while maintaining the catalyst at a temperature not substantially in excess of 1000° F.

4. A process for regenerating carbonized solid phosphoric acid catalysts which comprises contacting the catalyst with hot combustion gases of controlled oxygen content containing less than 5% by volume of water vapor until the carbonaceous matter has been burned off the catalyst, and subsequently steaming the catalyst to rehydrate the same.

5. A process for regenerating carbonized solid phosphoric acid catalysts which comprises contacting the catalyst with hot combustion gases of controlled oxygen content containing less than 5% by volume of water vapor until the carbonaceous matter has been burned off the catalyst, maintaining the catalyst during the burning of the carbonaceous matter at a temperature not substantially in excess of 1000° F., and subsequently steaming the catalyst to rehydrate the same.

6. In the regeneration of carbonized solid phosphoric acid catalysts, the improvement which comprises initially contacting the catalyst with hot combustion gases of relatively low oxygen content and containing less than 5% by volume of water vapor, gradually increasing the oxygen content of the gases and continuing the contacting of the gases with the catalyst until the latter has been substantially decarbonized, maintaining the catalyst during such decarbonization at a temperature not substantially in excess of 1000° F., and subsequently steaming the catalyst at a temperature within the approximate range of from 450 to 550° F.

7. In the burning of carbonaceous deposits from carbonized solid phosphoric acid catalyst, the improvement which comprises maintaining the combustion of the carbonaceous material by continuously introducing to the carbonized catalyst a mixture of gaseous combustion products and oxygen containing less than 5% by volume of water vapor.

8. A process for removing carbonaceous material from spent solid phosphoric acid catalyst which comprises burning fuel in the presence of a limited quantity of oxygen, dehumidifying resultant combustion gases to a moisture content of less than 5% by volume and adding oxygen thereto, and introducing the resultant mixture of oxygen and dehumidified combustion gases into contact with the catalyst at a temperature and for a time sufficient to burn the carbonaceous material from the catalyst.

9. A process for removing carbonaceous material from spent solid phosphoric acid catalyst which comprises burning fuel in the presence of a limited quantity of oxygen, dehumidifying resultant combustion gases to a moisture content of less than 5% by volume by scrubbing the gases with water, adding oxygen to the thus dehumidified gases, and introducing the resultant mixture of oxygen and dehumidified combustion gases into contact with the catalyst at a temperature and for a time sufficient to burn the carbonaceous material from the catalyst.

10. A process for removing carbonaceous material from spent solid phosphoric acid catalyst which comprises cooling hot combustion gases sufficiently to reduce the moisture content thereof to below 5% by volume, adding oxygen thereto and heating the resultant mixture to the ignition temperature of the carbonaceous material on the catalyst, and introducing the heated gases into contact with the catalyst for a sufficient time to burn the carbonaceous material therefrom.

11. A process for removing carbonaceous material from spent solid phosphoric acid catalyst which comprises burning fuel under super-atmospheric pressure, cooling resultant gaseous combustion products, while still under super-atmospheric pressure, sufficiently to reduce the moisture content thereof to below 5% by volume, and subsequently introducing said gaseous combustion products, together with oxygen, into contact with the catalyst at a temperature and for a time sufficient to burn the carbonaceous material from the catalyst.

12. A process for removing carbonaceous material from spent solid phosphoric acid catalyst which comprises burning fuel in the presence of water or steam and in the substantial absence of excess air, dehumidifying resultant combustion gases to a moisture content of less than 5% by volume and adding oxygen thereto, and introducing the resultant mixture of oxygen and dehumidified combustion gases into contact with the catalyst at a temperature and for a time sufficient to burn the carbonaceous material from the catalyst.

13. A process for removing by oxidation objectionable carbonaceous material from a granular catalyst containing phosphoric acid which comprises generating combustion gases by burning fuel with a quantity of air sufficient to cause complete combustion of the fuel but with substantially no excess air, cooling the products of combustion sufficiently to reduce the water vapor contents thereof to below 5% by volume, then adding limited amounts of air to the products of combustion, heating said mixture of air and combustion products to the ignition temperature of the carbonaceous material on the catalyst while gradually increasing the amount of oxygen in the gas mixture by a further addition of air in regulated amounts to maintain oxidation with the carbonaceous material at a maximum rate but without exceeding the temperature at which substantial deterioration of the catalyst begins, and contacting the oxygen-containing gas with said catalyst until the carbonaceous material has been burned therefrom.

14. A process for removing by oxidation objectionable carbonaceous material from a granular catalyst containing phosphoric acid which comprises generating combustion gases by burning fuel in a combustion chamber with a quantity of air sufficient to cause complete combustion of the fuel but with substantially no excess air, cooling the products of combustion by direct contact with water sufficiently to reduce the water vapor contents thereof to below 5% by volume, then adding limited amounts of air to the products of combustion, heating said mixture of air and combustion products in a heating coil to the ignition temperature of the carbonaceous material on the catalyst while gradually increasing the amount of oxygen in the gas mixture by a further addition of air in regulated amounts to maintain oxidation of the carbonaceous material at a maximum rate but without exceeding the temperature at which substantial deterioration of the catalyst begins, and contacting the oxygen-containing gas with said catalyst until the carbonaceous material has been burned therefrom.

15. A process for removing by oxidation objectionable carbonaceous material from a granular catalyst containing phosphoric acid which comprises generating combustion gases by burning fuel with a quantity of air sufficient to cause complete combustion of the fuel but with substantially no excess air, cooling the products of combustion sufficiently to reduce the water vapor contents thereof to below 5% by volume, then adding limited amounts of air to the products of combustion, heating said mixture of air and combustion products to the ignition temperature of the carbonaceous material on the catalyst while gradually increasing the amount of oxygen in the gas mixture to maintain oxidation of the carbonaceous material at a maximum rate but without exceeding the temperature at which substantial deterioration of the catalyst begins, and contacting the oxygen-containing gas with said catalyst until the carbonaceous material has been burned therefrom.

ROBERT PYZEL.